L. B. SKINNER.
HEAT REGENERATOR.
APPLICATION FILED DEC. 15, 1920.
Reissued Feb. 22, 1921. 15,052.
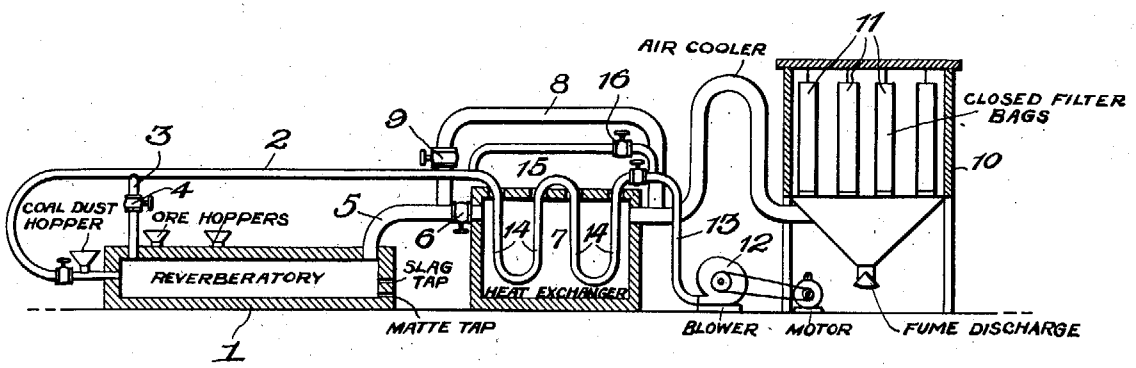
INVENTOR.
Lewis B. Skinner
BY R. A. Leeward
his ATTORNEY.

UNITED STATES PATENT OFFICE.

LEWIS BAILEY SKINNER, OF DENVER, COLORADO.

HEAT-REGENERATOR.

15,052. Specification of Reissued Letters Patent. Reissued Feb. 22, 1921.

Original No. 1,350,267, dated August 17, 1920, Serial No. 276,126, filed February 10, 1919. Application for reissue filed December 15, 1920. Serial No. 430,994.

*To all whom it may concern:*

Be it known that I, LEWIS B. SKINNER, a citizen of the United States, residing at Denver, in the county of Denver and State of Colorado, have invented certain new and useful Improvements in Heat-Regenerators; and I do hereby declare the following to be a full, clear, and exact description of the invention, such as will enable others skilled in the art to which it appertains to make and use the same.

This invention relates to heat regenerators and it relates more particularly to metallurgical apparatus comprising a reverberatory furnace adapted for smelting ores carrying volatilizable metal values, in combination with a heat regenerator or exchanger of the double-surface type into which hot fume-laden gases from the furnace are discharged and through which they flow in heat-transferring relation to air to be preheated for combustion in said furnace, the respective paths traversed by said furnace gases and said air in passing through the regenerator being separated by a metal wall, protected on the side exposed to said gases by a dense adherent coating of metalliferous fume.

The apparatus herein described is disclosed in my copending prior applications Serial Nos. 216,503 and 216,594, filed February 11, 1918.

The use of hot stoves in which the air entering to be preheated is passed through metal pipes (usually of iron) around which hot gases escaping from a metallurgical furnace are circulated for the purpose of transferring a portion of their heat to the air, is broadly old and well known in the art. But in such stoves of the character heretofore employed, the temperature of the heating gases is always below that at which iron begins to soften or burn. The principal object of this invention is to provide apparatus in which the metal walls separating the respective passages for furnace gases and combustion air are so protected on the side next the furnace gases that heating gases considerably higher in temperature than the temperature at which destruction of the metal would begin to occur can be used without damage to the separating walls.

I have discovered that when highly heated fumes carrying volatile compounds of metals are brought into contact with metallic surfaces there is deposited on the metal a tenacious coating of condensed fume which coating is sufficient in thickness to protect the metal both from oxidation and by reason of its lower heat conductivity, from excessive heating. This coating tenaciously adheres to a thickness sufficient to thoroughly protect the metal; but if it be exposed further to gases carrying metalliferous fume, said coating does not continue to build up in thickness beyond a fairly well definable limit which is insufficient to destroy the practical efficiency of the metal as regards heat transference. This is due to the fact that the adhesion of the condensed fume to metal is much more tenacious than its adhesion to previously deposited fume. Therefore the building up process proceeds until a certain thickness of fume has accumulated; beyond which there is no material accretion because if more fume is condensed on the surfaces it will flake off. The tenacious protective skin of condensed fume deposited on the metal is of relatively low heat conductivity as compared to the much greater heat conductivity of the metal which it protects. In accordance with the invention, advantage is taken of this fact to construct a heat exchanger or regenerator in such manner that passages are provided for hot furnace gases and for air, respectively, said passages being defined and separated from one another by metal walls and the wall surfaces adjacent the furnace gases being provided with a coating of the character above described.

For the sake of a concrete illustration, and in order to afford a fuller understanding of the invention, one type of metallurgical apparatus embodying the principles of the invention is illustrated more or less diagrammatically in the accompanying drawing forming a part hereof. The apparatus here shown is particularly adapted for use in smelting complex ores containing both volatile and non-volatile metal values which it is desired to separate and recover in as concentrated form as possible. For example, the ore to be treated may contain zinc, lead, copper, and precious metals, and the object is to obtain the bulk of the zinc and lead as a fume, to concentrate the copper and precious metals in a matte, and to separate the gangue or waste material of the ore in the form of a slag containing but relatively small amounts of metal values. According to the process set forth in my prior application Serial No. 216,594, such an ore is smelted under proper conditions, in a reverberatory furnace fired with preheated blast, the furnace temperature normally being 1200° C. or above. The present apparatus makes possible the use of the heavily fume-laden gases at these extremely high temperatures to preheat air for the hot blast, something of which no prior apparatus is capable so far as I am aware. The use of the Siemens type of regenerator in which brick checker work is employed, is impossible with the type of fume-laden furnace gases here in question, because the checker work would soon become clogged with fume and inoperative; and it has naturally been assumed that metal stoves of the double surface type would be destroyed if exposed to said gases at temperatures exceeding the softening point of the metal. The discovery that such metal stoves could be utilized in this connection when provided with a protective skin of condensed fume, constitutes, therefore, an important practical advance in this art.

Referring to the drawing, 1 represents a reverberatory furnace provided with hoppers for charging in ore, and also provided with firing means comprising a conduit 2 for furnishing preheated air for combustion of powdered coal supplied through the coal dust hopper, all as shown. A by-pass 3, valved at 4, provides means for controlling the character of the combustion in the furnace. Hot gases laden with a fume consisting chiefly of more or less oxidized zinc and lead are conducted from the furnace through conduit 5, and are normally discharged through valve 6 into the heat exchange chamber 7 of the regenerator device. Considerable fume may drop out of the gases and collect on the bottom of the chamber, being removed from time to time in any suitable manner without difficulty. A by-pass 8, valved at 9, is provided whereby the gases may be temporarily conducted around the regenerator chamber if desired. From the chamber 7 or the by-pass 8 as the case may be, the gases from the furnace go through an air cooler or a long conduit, as desired, to a bag house 10 provided with a plurality of fabric bags 11 into which the gases are discharged and which allow the escape of the products of combustion but arrest condensed metallic fume in the customary manner, such arrested fume being removable as desired through the fume discharge shown.

The heat exchanger or regenerator here illustrated is of the double surface type; that is to say, it is a regenerative stove through which the heating gases always flow by the same conduits or passages, and the air which is being heated likewise always follows the same path, which latter path is separate and distinct from that of the furnace gases and is separated therefrom by a metal wall. In the present example, the heating gases follow the passage in the chamber 7 between bends or coils 14 of iron pipe through which air to be preheated for combustion is conducted, the cool air being supplied through pipe 13 to said coils by any suitable means, such as the blower 12. For convenience, a by-pass 15, controlled by valve 16, is provided whereby a part of the air may be by-passed around the stove if it is desired at any time to lower the temperature of the air for combustion. As stated, the pipes 14 are of iron, and iron begins to soften at temperatures in the vicinty of 1000° C., and is also destructively oxidized if unprotected. As the temperature in the reverberatory furnace is upward of 1200° C., and may be 1300° C., or more, and since the fume-laden gases discharged into the heat exchanger are not at a much lower temperature, being generally at 1000° C., or above, unprotected iron pipes would obviously not withstand the conditions prevailing in the heat exchange chamber for any considerable time. The iron pipes are therefore protected in the manner characteristic of the invention. For example, before subjecting the pipe bends 14 to the full heat of the furnace gases, the furnace may be run at a reduced rate, or in some other way the temperature in the heat exchange chamber may be kept below the danger point, until fume carried into the chamber by the furnace gases has condensed on the pipe bends and built up a protecting layer of oxidized zinc and lead to a necessary extent, after which the furnace may be brought to full heat. By way of illustration, let it be assumed that the metal of the iron pipes itself is one inch in thickness, and that the built-on protecting layer of fume thus formed is also one inch thick. If the fume has say one-tenth of the heat conductivity of the iron, and if the fume-laden gases have a temperature of 1200° or 1300° C., when the furnace is operating normally, it is evident that by passing cool air through the pipes in proper quantity the air will abstract heat rapidly enough from the iron pipe to keep its temperature materially below the danger point, this danger point being attained only at some locality beyond the outer surface of the iron pipe and within the adherent protecting layer of fume. By utilizing a sufficient length of metal pipe and continuously circulating air therethrough, it is feasible to preheat this air to a temperature of 500° C., or above, without endangering the structural integrity of the heat exchanger. The combination of such a regenerator with a reverberatory furnace therefore makes it possible for the first time to treat ores of the character described at high temperatures in a reverberatory furnace in an efficient and economical manner.

Instead of initially operating the furnace at a reduced rate, another method, which does not involve delay in bringing the furnace up to full heat, may be adopted for providing the heat exchanger pipes with a dense protective coating of fume. This consists in preliminarily protecting the pipes by more or less temporary covering means of some kind, the temporary covering means being most desirably of such nature as to disintegrate gradually during the heating-up operation, and to be eventually replaced wholly or in part by the dense metalliferous fume coating already described. For example, I may mechanically coat or smear the pipes, especially those at the end of the regenerator nearest the furnace, with clay mud; or fire clay sleeves may be dropped over these pipes. With the pipes thus temporarily protected, the furnace may be brought up to full heat quickly. The protective layer provided by the mud coating or the fireclay sleeves, as the case may be, ultimately cracks at the high temperatures involved, and peels off or falls off but only rather gradually. That is, it breaks away progressively in different spots enabling the iron of the pipes to conduct the heat away from the successively exposed surfaces fast enough to prevent substantial damage. In the meantime the exposed surfaces become permanently coated with a dense adherent layer of condensed fume, which replaces part or eventually all of the mechanically applied covering.

By means of the described apparatus, therefore, it is possible to effectively preheat the air for combustion under the conditions described, that is, to employ a double surface hot stove type of heat exchanger with fume-laden furnace gases at a temperature which may be considerably above that at which the metal of the stove would soften or be seriously damaged, while at the same time there is no stoppage of furnace operation by reason of fume and dust lodging within the heat exchanger and rendering it inoperative.

What I claim is:

1. Metallurgical apparatus comprising the combination, with a metallurgical furnace, of a heat regenerator having passages for conducting air to and for conducting gases from said furnace, respectively, said passages being defined and separated by a metal wall, and the wall surface next the furnace gases being provided with an adherent protective coating of condensed metalliferous fume.

2. Metallurgical apparatus comprising the combination, with a reverberatory furnace, of a heat regenerator comprising a chamber into which gases are discharged from said furnace, and a metal conduit disposed in said chamber and arranged to conduct air for combustion through said chamber for supply to said furnace, said conduit having its outer surface protected by a metalliferous fume coating of lower heat conductivity than the metal of the conduit.

3. Metallurgical apparatus comprising the combination, with a reverberatory furnace, of a heat regenerator comprising a chamber into which gases are discharged from said furnace, and air-preheating coils or bends of iron pipe disposed in said chamber and provided externally with a dense adherent coating of zinc-lead fume.

4. Metallurgical apparatus comprising the combination, with a reverberatory furnace, of a heat regenerator comprising a chamber into which gases are discharged from said furnace, and air-preheating coils or bends of iron pipe disposed in said chamber and provided externally with a dense adherent coating of zinkiferous fume.

5. Metallurgical apparatus comprising the combination with a reverberatory furnace, of a heat regenerator having passages for conducting air to and for conducting gases from said furnace, respectively, said passages being defined and separated by a metal wall, and the wall surface next the furnace gases being provided with an adherent protective coating of condensed metalliferous fume.

In testimony whereof I hereunto affix my signature.

LEWIS BAILEY SKINNER.